United States Patent
Katakura et al.

(10) Patent No.: US 9,951,713 B2
(45) Date of Patent: Apr. 24, 2018

(54) FUEL INJECTION APPARATUS

(71) Applicant: Fuji Jukogyo Kabushiki Kaisha, Tokyo (JP)

(72) Inventors: Yuichi Katakura, Tokyo (JP); Koki Ando, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/257,769

(22) Filed: Sep. 6, 2016

(65) Prior Publication Data

US 2017/0082058 A1 Mar. 23, 2017

(30) Foreign Application Priority Data

Sep. 18, 2015 (JP) ................................. 2015-184718

(51) Int. Cl.
*F02F 1/24* (2006.01)
*F02D 41/40* (2006.01)
(Continued)

(52) U.S. Cl.
CPC ............ *F02F 1/242* (2013.01); *F02B 23/104* (2013.01); *F02D 41/38* (2013.01); *F02D 41/401* (2013.01);
(Continued)

(58) Field of Classification Search
CPC .............. F02B 2023/103; F02B 23/104; F02B 2275/14; F02B 23/0621; F02B 23/0624;
(Continued)

(56) References Cited

U.S. PATENT DOCUMENTS

| | | | |
|---|---|---|---|
| 6,725,828 B1 * | 4/2004 | Han | F02B 17/005 123/285 |
| 8,151,762 B2 * | 4/2012 | Nishimoto | F02B 23/104 123/298 |

(Continued)

FOREIGN PATENT DOCUMENTS

| | | |
|---|---|---|
| JP | H 10-317973 A | 12/1998 |
| JP | 2000-130171 A | 5/2000 |

(Continued)

OTHER PUBLICATIONS

JPO Decision to Grant a Patent dated Jan. 10, 2017.
(Continued)

*Primary Examiner* — Long T Tran
(74) *Attorney, Agent, or Firm* — McGinn IP Law Group, PLLC (57) ABSTRACT

A fuel injection apparatus includes: an injector disposed at a position offset from an ignition plug toward an intake port and injecting a fuel spray toward a crown surface of a piston, and an injection controller causing the injector to perform injection in accordance with an amount and timing of fuel injection preset in accordance with an operating state of an engine. The piston includes: a first recess formed by recessing a central portion of the crown surface and a second recess formed by recessing part of the first recess on an injector side further than the first recess. The injector injects 50% or more of fuel to be injected for the last fuel injection toward the second recess during a compression stroke, and injects part of the fuel to be injected for the last fuel injection toward an area of the first recess other than the second recess.

8 Claims, 6 Drawing Sheets

(51) Int. Cl.
*F02F 3/28* (2006.01)
*F02D 41/38* (2006.01)
*F02B 23/10* (2006.01)

(52) U.S. Cl.
CPC ........ *F02F 3/285* (2013.01); *F02B 2023/103* (2013.01); *F02D 41/402* (2013.01); *F02D 2041/389* (2013.01); *Y02T 10/125* (2013.01); *Y02T 10/44* (2013.01)

(58) Field of Classification Search
CPC ...... F02F 3/28; F02F 1/242; F02F 3/00; F02F 3/027
See application file for complete search history.

(56) References Cited

U.S. PATENT DOCUMENTS

| | | | |
|---|---|---|---|
| 2009/0025680 | A1 | 1/2009 | Kihara et al. |
| 2010/0175660 | A1* | 7/2010 | Nishimoto ............ F02B 23/104 123/305 |
| 2010/0326388 | A1* | 12/2010 | Storm ................ F02B 23/0654 123/143 B |

FOREIGN PATENT DOCUMENTS

| | | |
|---|---|---|
| JP | 2002-295261 A | 10/2002 |
| JP | 2006-257943 A | 9/2006 |
| JP | 2008-151020 A | 7/2008 |
| JP | 2009-024683 A | 2/2009 |
| JP | 2010-096088 A | 4/2010 |
| JP | 2013-113119 A | 6/2013 |
| JP | 2013-113120 A | 6/2013 |
| JP | 2015-021389 A | 2/2015 |

OTHER PUBLICATIONS

JPO Notification of Refusal dated Sep. 27, 2016, with an English translation thereof (previously submitted on Oct. 20, 2016).
Japanese Office Action dated Sep. 27, 2016 with an English translation thereof.

* cited by examiner

← DIRECTION OF CRANK SHAFT

FIG. 5

↑ INTAKE SIDE

↓ EXHAUST SIDE

FUEL INJECTION APPARATUS

CROSS-REFERENCE TO RELATED APPLICATIONS

The present application claims priority from Japanese Patent Application No. 2015-184718 filed on Sep. 18, 2015, the entire contents of which are hereby incorporated by reference.

BACKGROUND

1. Technical Field

The present invention relates to a fuel injection apparatus for a spark-ignited cylinder fuel injection engine and, more specifically, to the fuel injection apparatus having improved ignitability and combustion stability at the time of stratified charge combustion while ensuring a performance at the time of uniform combustion.

2. Related Art

For example, in a spark-ignited cylinder fuel injection (direct injection) engine used as a travelling power source for a vehicle, improvements in ignitability and combustion stability of an air-fuel mixture are required. In order to achieve these improvements, forming an air-fuel-mixture rich area in a periphery of an ignition plug is required at the time of ignition, which enables desirable stratified charge combustion.

In the related art, in order to form such an air-fuel-mixture rich area (layer), various methods are proposed. These methods include providing a crown surface of a piston with an uneven shape which enables swirling up of fuel sprays that are injected from an injector toward the crown surface and guiding the swirled fuel sprays toward the ignition plug.

In order to achieve both a stratified charge combustion performance and an uniform combustion performance concurrently, for example, Japanese Unexamined Patent Application Publication (JP-A) No. 10-317973 describes a piston that is assembled to a pentroof type combustion chamber having two each of intake and exhaust valves. The piston includes a pair of intake valve recesses and a substantially true circle cavity combustion chamber that is formed at a central portion of the pair of intake valve recesses.

In order to expand an operating range that allows stratified charge combustion, JP-A No. 2000-130171 describes formation of a bowl stretching along a diameter line of a piston, which is orthogonal to a fuel spray axis, at a central portion of a crown surface of the piston, and a recess which is recessed further from a bowl surface and extends from an injector side to the bowl.

In order to increase a period that allows ignition at the time of stratified charge combustion, JP-A No. 2002-295261 describes formation of a recess at a central portion of a crown surface of a piston and a shelf having a smaller depth at a portion of the recess opposite to an injector.

In order to improve ignitability in a low load, range, JP-A No. 2006-257943 describes formation of a recess having a substantially egg shape when seen in a direction of a cylinder axis on a crown surface of a piston.

In order to achieve combustion stability at the time of ignition retard without providing a deep cavity on a piston, JP-A No. 2008-151020 describes provision of a first step lower on an intake side and higher on an exhaust side on a crown surface and a second step provided beside the first step and being higher on an outer peripheral side of a cylinder under an ignition plug.

JP-A No. 2010-96088 describes formation of a groove-like recess stretching from a central portion of a crown surface to an outer peripheral surface of a piston in the vicinity of an injector. The recess has a depth increasing as it approaches a central portion of the piston.

JP-A No. 2013-113119 describes formation of a trapezoidal shaped cavity having a width decreasing gradually from an injector side toward a central portion of a piston.

JP-A No. 2013-113120 describes formation of trapezoidal shaped cavity having a width increasing gradually from an injector side toward a central portion of a piston.

In a direct injection engine that includes an ignition plug at a central portion of a combustion chamber and performs cylinder injection from an injector disposed at a position offset toward an intake side, in a case where ignitability and combustion stability of an air-fuel mixture are considered to be important like a case of fast idle immediately after starting from a cold state, for example, it is desired to form a recess (step) having a predetermined shape on a crown surface of a piston to form a rich air-fuel-mixture in the periphery of the ignition plug and cause the engine to perform stratified charge combustion by injecting fuel from the injector into the recess to swirl up the fuel toward the ignition plug.

In contrast, during normal travelling after completion of warm-up or in a high-load range rendered by travelling with a throttle wide open, a gas flow in a cylinder becomes active and so-called uniform combustion is mainly performed. Therefore, it is desired to uniformize an air-fuel ratio in the cylinder as much as possible to avoid generation of a range partly becoming lean and causing unstable combustion.

SUMMARY OF THE INVENTION

It is desired to provide a fuel injection apparatus having improved ignitability and combustion stability at the time of stratified charge combustion while ensuring a performance at the time of uniform combustion.

The present invention solves the above problems as described below.

A first aspect of the present invention is related to a fuel injection apparatus used for an engine that includes: a piston; a cylinder that allows insertion of the piston; an ignition plug disposed in the vicinity of a center axis of the cylinder; and an intake port and an exhaust port disposed at positions where the ignition plug is interposed therebetween. Further, the fuel injection apparatus includes: an injector that is disposed at a position offset from the ignition plug toward the in take port and injects a fuel spray toward a crown surface of the piston, and an injection controller that causes the injector to perform injection in accordance with an amount of fuel injection and timing of fuel injection that are preset in accordance with an operating state of the engine. The piston includes: a first recess that is formed by recessing a central portion of the crown surface; and a second recess that is formed by recessing part of the first recess on an injector side further than the first recess. The injector injects 50% or more of fuel that is to be injected for the last fuel injection toward the second recess during a compression stroke of the engine, and injects part of the fuel to be injected for the last fuel injection toward an area of the first recess other than the second recess.

In this specification and Claims, "the last fuel injection" means an injection performed for the last time out of a series of injections when a plurality of times of fuel injections are performed in one combustion cycle. When only one time of the fuel injection is performed per one combustion, it means the corresponding injection.

The injector may be a multiple hole injector that forms multiple beams including fuel sprays and travelling in a radial fashion. The injector may inject at least a half of the beams toward the second recess and inject at least one of the beams toward the area of the first recess other than the second recess at the last fuel injection that is performed during the compression stroke of the engine.

Among the beams, the injector may inject at least one beam travelling along a straight line that connects the injector and the ignition plug and a plane including a center axis of the cylinder and at least two beams in a pair travelling substantially symmetrically with respect to the plane toward the second recess at the last fuel injection performed during the compression stroke of the engine.

An outer peripheral edge of the second recess may have a step over the entire circumference with respect to other portions of the crown surface and have a pair of lateral sides formed straightly so as to extend substantially in parallel to the straight line that connects the injector and the ignition plug when seen in a direction of a cylinder axis.

DETAILED DESCRIPTION

The present invention achieves provision of a fuel injection apparatus having improved ignitability and combustion stability at the time of stratified charge combustion while ensuring a performance at the time of uniform combustion by a fuel injection apparatus used for an engine having a first recess (cavity) 150 that has a function to enhance a gas flow and a second recess (step) 160 that has a function to form a rich air-fuel mixture in a periphery of an ignition plug 210 by swirling up fuel toward the ignition plug 210 on a crown surface 100 of a piston 1. The fuel injection apparatus injects least 50% of an amount of fuel to be injected at the last fuel injection into the step and injects part of the fuel into the cavity.

An example of a fuel injection apparatus according to Example 1 of the present invention will be described below.

The fuel injection apparatus of Example 1 may be used for a gasoline cylinder fuel injection (direct injection) engine used for vehicles such as passenger vehicles as a travelling power source.

The engine includes a pentroof type combustion chamber 200 (see FIGS. 6A to 6C) including two intake valves and two exhaust valves per cylinder disposed at a predetermined valve holding angle.

The combustion chamber 200 includes an ignition plug (spark plug) 210 at a central portion (near an axial center of a cylinder bore).

The combustion chamber 200 includes a multiple hole injector 220. A nozzle of the injector 220 is inserted into the combustion chamber 200 from a distance of a pair of the intake ports.

The injector 220 injects a plurality of fuel sprays (beams) toward a crown surface 100 of a piston 1 at a later stage of a compression stroke.

The injector 220 injects, for example, six beams having substantially the same amount of fuel.

The injector 220 receives a valve opening signal from an engine control unit (ECU), which is not illustrated, in accordance with an amount of fuel injection and timing of the fuel injection set by the ECU based on a number of revolutions, a load state, and warm-up state of the engine, and performs fuel injection. The ECU integrally controls the engine and accessories thereof.

In the case where a plurality of times of the fuel injection are performed per cycle, the ECU sets the amount of the fuel injection and the timing of the fuel injection for each fuel injection.

In one implementation, the ECU serves as an "injection controller".

Figure 1:
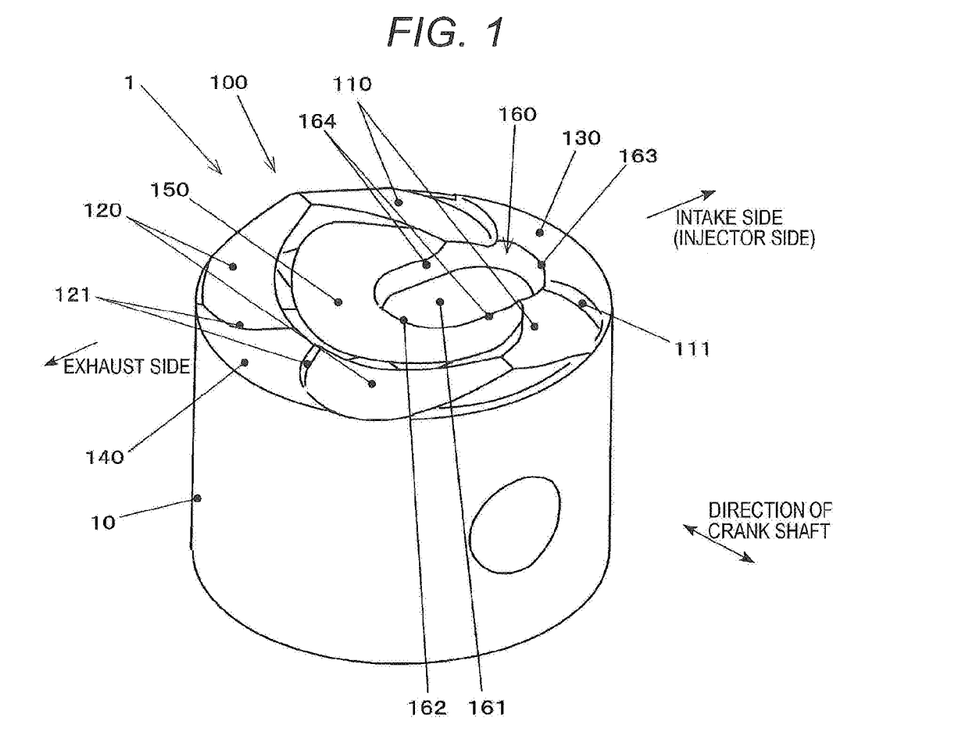
FIG. 1 is a perspective view of an appearance of a piston of an engine having Example 1 of a fuel injection apparatus according to an implementation of the present invention.

FIG. 1 is a perspective view of an appearance of a piston of an engine having the fuel injection apparatus of Example 1.

Figure 2:
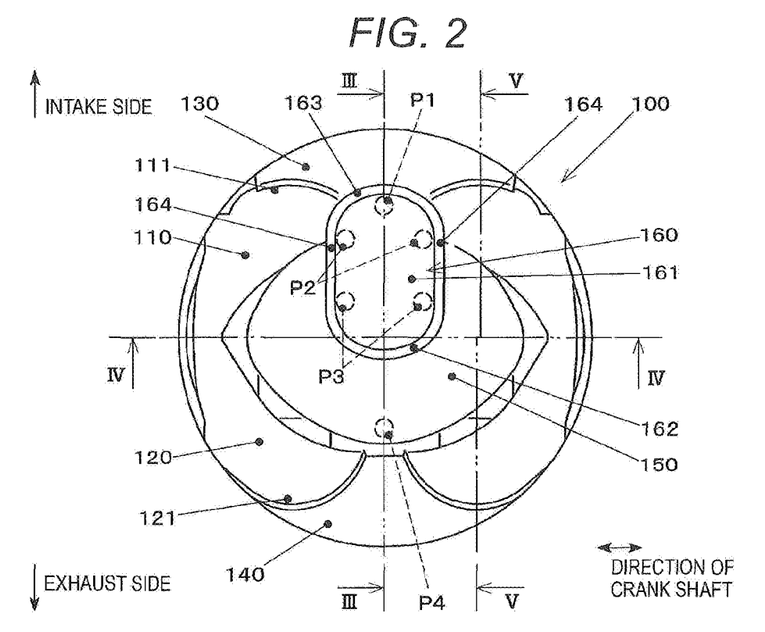
FIG. 2 illustrates a crown surface of the piston in FIG. 1 seen in a direction of a cylinder axis.

FIG. 2 illustrates the crown surface of the piston of FIG. 1 seen in a direction of a cylinder axis.

Figure 3:
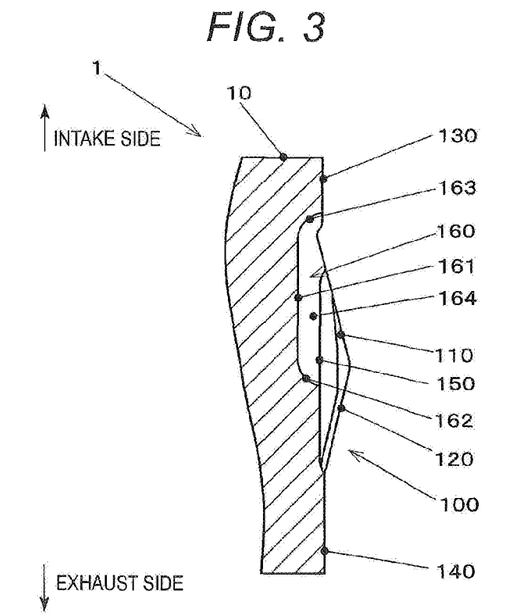
FIG. 3 is a cross sectional view seen in a direction indicated by arrows III-III in FIG. 2.

FIG. 3 is a cross sectional view seen in the direction indicated by arrows III-III in FIG. 2.

Figure 4:
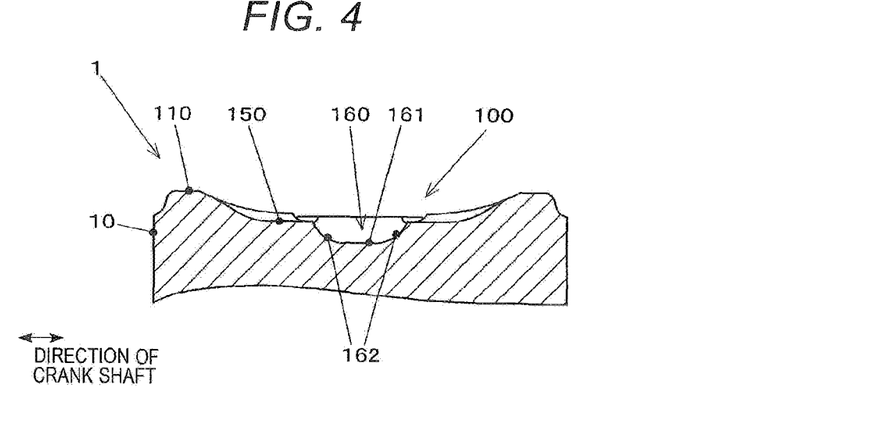
FIG. 4 is a cross sectional view seen in a direction indicated by arrows IV-IV in FIG. 2.

FIG. 4 is a cross sectional view seen in the direction indicated by arrows IV-IV in FIG. 2.

Figure 5:
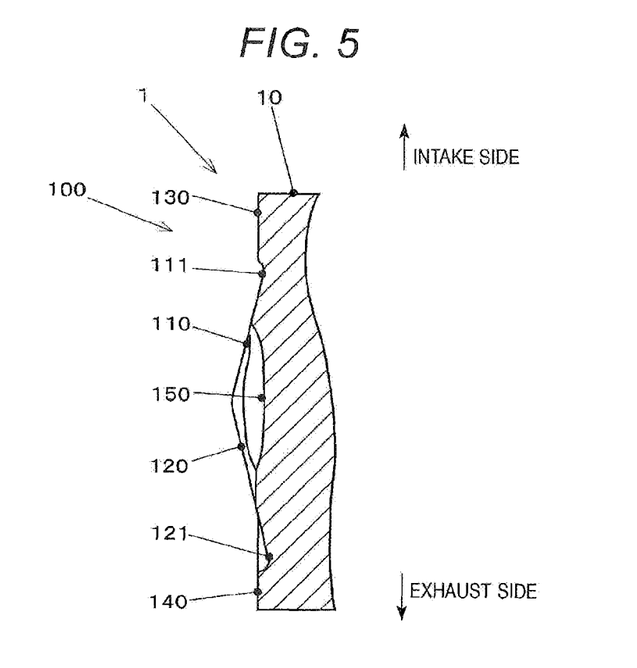
FIG. 5 is a cross sectional view seen in a direction indicated by arrows V-V in FIG. 2.

FIG. 5 is a cross sectional new seen in the direction indicated by arrows V-V in FIG. 2.

The piston 1 is formed by casting or forging, for example, an aluminum-based alloy to a rough shape and then applying a mechanical process and a surface treatment as determined in advance.

The piston 1 has an outer peripheral surface 10 having a substantially cylindrical outer surface and the crown surface 100, which is an end surface on a cylinder head side.

The outer peripheral surface 10 is disposed so as to face an inner peripheral surface of the cylinder and move in sliding contact therewith, and has a groove extending in a circumferential direction. A piston ring, an oil ring, and the like, which are not illustrated, are fitted into the groove.

The crown surface 100 is a disc-shaped surface which constitutes part of a combustion chamber of the engine in cooperation with the cylinder head and the like, which are not illustrated.

The crown surface 100 integrally has intake side bevels 110, exhaust side bevels 120, an intake side squish area 130, an exhaust side squish area 140, a cavity 150, and a step 160.

The intake side bevels 110 and the exhaust side bevels 120 have a substantially flat shape and are disposed so as to face umbrella-shaped valve elements of the intake valves and the exhaust valves, which are not illustrated. The intake side bevels 110 and the exhaust side bevels 120 stretch substantially along a direction of a crank shaft.

The intake side bevels 110 and the exhaust side bevels 120 are disposed so as to match the shape of the pentroof typed combustion chamber 200 and incline with respect to a plane that is orthogonal to a center axis of a bore so as to protrude on the central side of the bore toward the cylinder head.

The intake side bevels 110 each have an intake valve recess 111 at an end opposite to the exhaust side bevels 120.

The exhaust side bevels 120 each have an exhaust valve recess 121 at an end opposite to the intake side bevels 110.

The intake valve recesses 111 and the exhaust valve recesses 121 are recesses that avoid interference of the intake valves and the exhaust valves with respect to the crown surface 100, and are disposed at two positions corresponding to the positions of the valves along the direction of the crank shaft.

The intake side squish area 130 and the exhaust side squish area 140 face the surfaces on the cylinder head side at a minute distance therebetween when the piston 1 takes a position in the vicinity of an upper dead center.

The squish areas 130 and 140 form a squish flow blowing out toward the central side of the combustion chamber 200 when the piston 1 approaches a compression upper dead center, thereby activating a gas flow.

The intake side squish area 130 is formed from areas adjacent to the intake valve recesses 111 to an outer peripheral edge of the crown surface 100.

The exhaust side squish area 140 is formed from areas adjacent to the exhaust valve recesses 121 to the outer peripheral edge of the crown surface 100.

The intake side squish area 130 and the exhaust side squish area 140 have a flat shape which is substantially orthogonal to an axial line of the cylinder bore.

The cavity 150 is provided at a central portion of the crown surface 100.

The cavity 150 is formed by recessing the crown surface 100 with respect to other portions such as the intake side bevels 110, the exhaust side bevels 120, the intake side squish area 130, and the exhaust side squish area 140.

A principal portion of the cavity 150 is formed substantially along a plane that is orthogonal to the axial line of the cylinder bore.

The cavity 150 is formed by recessing a central portion of the pentroof shape that is formed by the intake side bevels 110 and the exhaust side bevels 120.

As illustrated in FIG. 2 and so forth, the cavity 150 have an ellipse shape having a long axis that extends substantially along the crank shaft direction in plan view seen in the direction of the axial line of the cylinder bore.

The cavity 150 is retracted slightly on a crank side with respect to the intake side squish area 130 and the exhaust side squish area 140.

An outer peripheral edge of the cavity 150 is coupled to other surfaces via gently recessed curved surface.

In one implementation, the cavity 150 may serve as a "first recess" and have a function of enhancing the gas flow in the cylinder.

The step 160 extends from the central portion of the crown surface 100 to the intake side squish area 130 recessed with respect to the other surfaces.

As illustrated in FIG. 2 and so forth, the step 160 has an oval shape elongated along a direction connecting the ignition plug disposed at substantially a center of the cylinder bore and the injector when seen in the direction of the axial line of the cylinder bore.

In one implementation, the step 160 may serve as a "second recess" and have a function to deflect travelling directions of the fuel sprays injected from the injector 220 toward the cylinder head and form a rich air-fuel mixture in the periphery of the ignition plug 210.

The step 160 has a bottom surface 161, a central-side step 162, an outer-diameter-side step 163, and straight guide steps 164.

The bottom surface 161 is a substantially flat surface formed on a deepest portion of the step 160.

The bottom surface 161 has a flat shape substantially parallel to a plane that is orthogonal to the axial line of the cylinder bore.

The bottom surface 161 is recessed toward the crank by a predetermined dimension with respect to the principal portion of the cavity 150 in the periphery of the step 160.

The central-side step 162, the outer-diameter-side step 163, and the straight guide steps 164 are stepped portions formed continuously along the outer peripheral edge of the step 160 over the entire circumference.

The central-side step 162, the outer-diameter-side step 163, and the straight guide steps 164 rise from the bottom surface 161 toward the cylinder head, and coupling portions to the bottom surface 161 have a recessed curved shape.

In contrast, ends of the central-side step 162, the outer-diameter-side step 163, and the straight guide steps 164 on the cylinder head side are coupled to other surfaces so as to form pointed edges.

The central-side step 162 constitutes an end of the step 160 on the bore central side (the ignition plug 210 side).

The central-side step 162 is disposed at a central portion of the cavity 150 and has a plan view having an arcuate shape substantially disposed so as to protrude on the exhaust side with a center angle of 180° when seen in the direction of the axial line of the cylinder bore.

The central-side step 162 is disposed so as to include the ignition plug 210 on an inner diameter side thereof when seen in the direction of the axial line of the cylinder bore.

The outer-diameter-side step 163 constitutes part of an end of the step 160 on a bore outer diameter side (injector 220 side).

The outer-diameter-side step 163 extends along the intake side bevels 110 and the intake side squish area 130 and has an arcuate shape having a central angle of 180° substantially disposed so as to protrude on the intake side in plan view when seen in the direction of the axial line of the cylinder bore.

The straight guide steps 164 are a pair of lateral sides (external common tangent for these arcs) provided in parallel to each other so as to linearly couple both ends of the central-side step 162 and both ends of the outer-diameter-side step 163, respectively.

The straight guide steps 164 are disposed substantially in parallel to a straight line connecting the ignition plug 210 and the injector 220 when seen in the direction of the axial line of the cylinder bore.

FIG. 2 illustrates hitting areas P1 to 4 that the injector 220 forms on the crown surface 100 by the fuel sprays with broken line circles.

Here, the hitting areas P1 to 4 indicate hitting areas formed by injection performed at last in a late stage of the compression stroke (the last fuel injection) when a plurality of times of fuel injection are performed per one combustion cycle.

In the case where the stratified charge combustion or the weak stratified charge combustion (an intermediate state between the stratified charge combustion and the uniform combustion) is performed by one fuel injection per one combustion cycle, the same hitting areas are obtained.

As illustrated in FIG. 2, the injector 220 is, for example, a multiple hole injector that forms six beam-shaped fuel sprays, and the five hitting areas P1, P2, and P3 out of six are preset within the step 160.

One P1 of the hitting areas P1 to P3 of these five fuel sprays is disposed in an area adjacent to the end of the outer-diameter-side step 163 on the outer diameter side of the bore.

The pair of hitting areas P2 and the pair of hitting areas P3 are disposed adjacent to the straight guide steps 164, respectively.

Two pairs of hitting areas P2 and P3 are disposed in substantially plane symmetry with respect to a plane including the straight line that connects the injector 220 (injection hole portion) and the ignition plug 210 (electrode) and the center axis of the cylinder.

The fuel sprays reaching the hitting areas P2 and P3 from the injector 220 proceed substantially symmetrically with respect to the plane.

The hitting areas P2 are disposed on a side closer to the hitting area P1 (or to the outer-diameter-side step 163) in a longitudinal direction of the straight guide steps 164.

The hitting areas P3 are disposed on a side farther from the hitting area P1 (or from the central-side step 162) in the longitudinal direction of the straight guide steps 164.

Another hitting area P4 of the fuel sprays is disposed in the cavity 150 at a position deviated radially outward from the central-side step 162.

The hitting areas P1 and P4 are disposed substantially on a plane including the straight line that connects the injector 220 and the ignition plug 210 and the center axis of the cylinder.

The beams of the fuel sprays reaching the hitting areas P1 and P4 from the injector 220 proceed substantially along the plane.

In this manner, the fuel sprays injected into the step 160 are guided along the inner surface of the step 160 toward the cylinder bore-central side, are swirled up toward the cylinder head by the recessed curved surface of the central-side step 162, thereby forming an air-fuel ratio rich area in the periphery of the ignition plug 210 immediate before an ignition time.

Figure 6A:
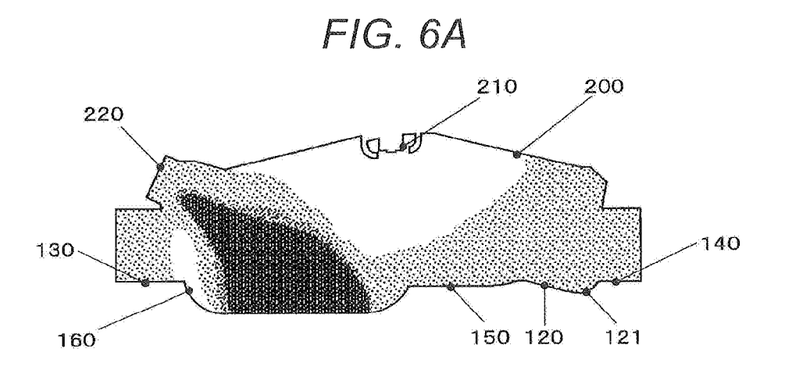
FIGS. 6A to 6C chronologically illustrate results of a behavior simulation of an air-fuel mixture in Example 1.
Figure 6B:
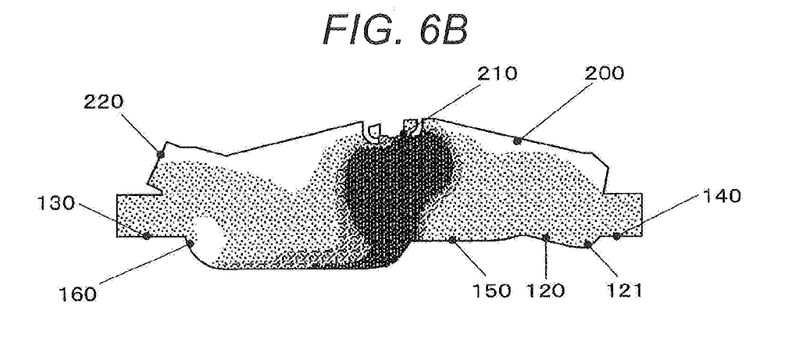
Figure 6C:
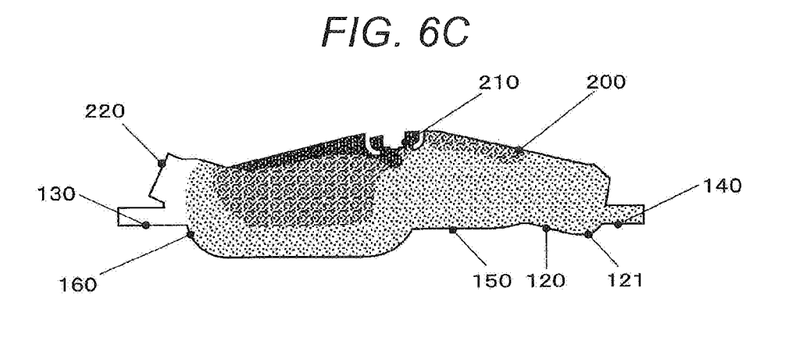

FIGS. 6A to 6C chronologically illustrate results of a behavior simulation of an air-fuel mixture in Example 1.

FIG. 6A, FIG. 6B, and FIG. 6C illustrate a cross section of the bore center taken orthogonally to an axis of rotation of the crank shaft at crank angles of A° before the compression upper dead center, B° before the compression upper dead center and C° after the compression upper dead center (where A°>B°>C°, C° is a degree at the time of ignition), and indicate that the darker pert has a richer air-fuel mixture.

In Example 1, with the provision of the straight guide steps 164, the fuel sprays are guided toward the center of the cylinder bore efficiently while reducing leakage from the intake side of the step 160, so that the fuel sprays may be swirled up at the central-side step 162 toward the cylinder head.

Consequently, as illustrated in FIG. 6C, the air-fuel mixture-rich area may be formed from the periphery of the ignition plug 210 continuously to the intake side, so that the ignitability and the combustion stability may be improved.

Advantageous effects of the aforesaid fuel injection apparatus according to Example 1 of the present invention will be described below while comparing with a fuel injection apparatus of Example 2 of the present invention and with a fuel injection apparatus of a comparative example of the present invention.

As regards Example 2 and the comparative example, the substantially same portions or areas as those of Example 1 are denoted by the same reference numerals, and description will be omitted, and only different points will be described.

Figure 7A:
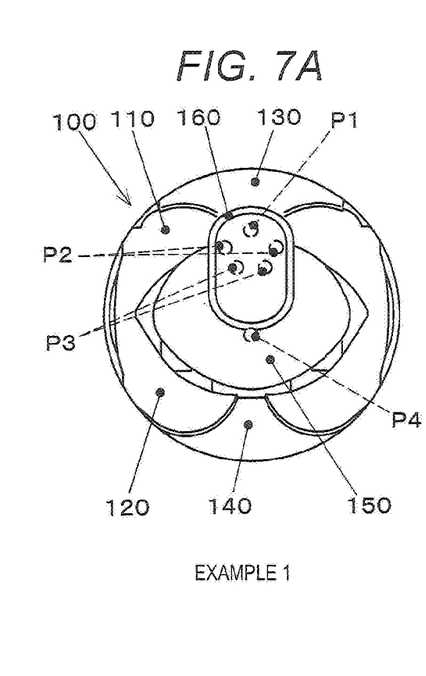
FIGS. 7A to 7C are drawings of crown surfaces of pistons according to the fuel injection apparatuses of Example 1, Example 2, and the comparative example of the present invention illustrating areas where fuel sprays (beams) hit.
Figure 7B:
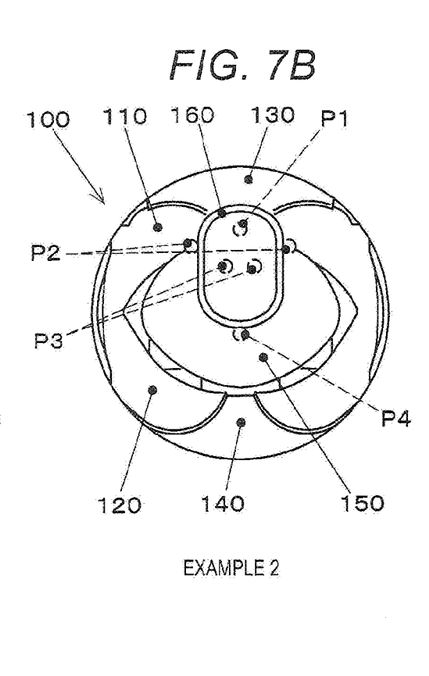
Figure 7C:
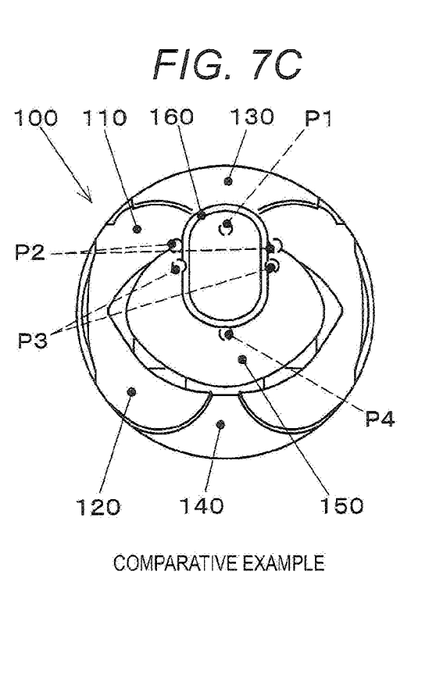

FIGS. 7A to 7C are drawings of crown surfaces of pistons according to the fuel injection apparatuses of Example 1, Example 2, and the comparative example illustrating areas where fuel sprays (beams) hit.

FIGS. 7A, 7B, and 7C illustrate hitting areas P1 to 4 in Example 1, Example 2, and the comparative example, respectively.

In Example 2 illustrated in FIG. 7B, a distance between a pair of the hitting areas P2 is increased in a direction of the crank shaft (horizontal direction in FIGS. 7A to 7C), and the hitting areas P2 are deviated from the straight guide steps 164 and are disposed outside the step 160 and inside the cavity 150 when compared with respect to Example 1.

In the comparative example illustrated in FIG. 7C, distances between the pairs of hitting areas P2 and P3 are increased in a direction of the crank shaft, and the hitting areas P2 and P3 are deviated from the straight guide steps 164 to outside the step 160 and inside the cavity 150 when compared with respect to Example 1.

Figure 8:
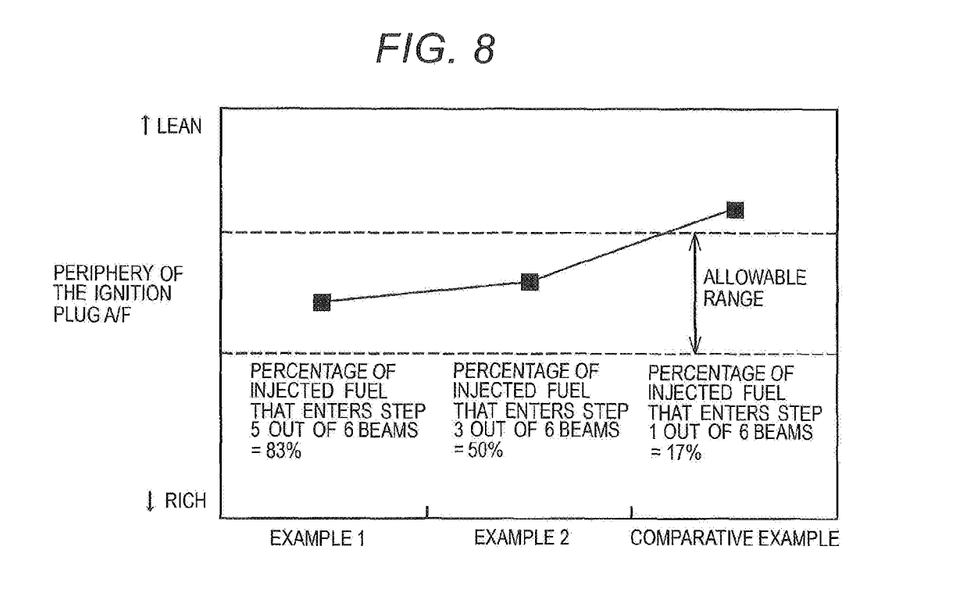
FIG. 8 is a graph illustrating an air-fuel ratio in the peripheries of ignition plugs of engines having the fuel injection apparatuses according to Example 1, Example 2, and the comparative example.

FIG. 8 is a graph illustrating an air-fuel ratio (results of simulation) in the peripheries of ignition plugs of engines having the fuel injection apparatuses according to Example 1, Example 2, and the comparative example.

In FIG. 8, a vertical axis represents an air-fuel ratio (A/F) immediately before the ignition timing, and indicates that an upper side corresponds to a lean side, and a lower side corresponds to a rich side.

As illustrated in FIG. 8, in Example 1 in which 5 beams out of 6 beams (approximately 83% of an amount of last fuel injection) are injected into the step 160 and Example 2 in which 3 beams out of 6 beams (approximately 50% of the amount of last fuel injection) are injected into the step 160, the air-fuel ratios within an allowable range which can achieve combustion stability and ignitability may be obtained in the periphery of the ignition plug 210.

Accordingly, injection of at least 50% of the amount of last fuel injection into the step 160 is sufficient for making the air-fuel mixture in the periphery of the ignition plug 210 richer.

In contrast, in the comparative example in which 1 beam out of 6 beams (approximately 17% of the amount of last fuel injection) is injected into the step 160, it is understood that stratification is insufficient, and the air-fuel ratio in the periphery of the ignition plug 210 is on a leaner side with respect to the allowable range, so that achievement of the combustion stability and the ignitability is difficult.

As described thus far, according to Examples 1 and 2 of the present invention, injection of at least 50% of the amount of last fuel injection into the step 160 that has the straight guide steps 164 may form a sufficiently rich air-fuel mixture in the periphery of the ignition plug 210, so that ignitability and combustion stability of the air-fuel mixture are achieved.

In addition, in uniform combustion which is performed during a normal operation or a high-load operation of the engine by injecting part of fuel to inside the cavity 150 that enhances a gas flow in the cylinder and outside the step 160 and causing the gas flow such as a tumble flow formed in the cylinder and enhanced in the cavity 150 to entrain the injected fuel, desirable combustion is achieved while ensuring uniformity of the air-fuel mixture.

In addition, injection of fuel, which is to be injected to portions other than the step 160, into the cavity 150 may achieve reduction in probability that the fuel is adhered to a cylinder wall surface, reduction in hydrocarbon (HC) and the like in the exhaust gas, and prevention of dilution of oil by the fuel.

Modification

The present invention is not limited to the above example and various modifications and changes are allowed. These modifications and changes are also included in the technical scope of the invention.

For example, the shape, the dimensions and the disposition of each portion of the crown surface of the piston are not limited to a configuration of the example described above, and may be modified as needed.

In addition, the number and disposition of the beams of infected by the injector may be modified as needed within a scope defined in Claims.

The implementations of the present invention is not limited to a gasoline engine, and may be applied to engines using other fuels such as those forming an air-fuel mixture by spraying liquid fuel into a combustion chamber and performing spark ignition.

The invention claimed is:

1. A fuel injection apparatus used for an engine that includes:
    a piston;
    a cylinder that allows insertion of the piston;
    an ignition plug disposed in the vicinity of a center axis of the cylinder, and
    an intake port and an exhaust port disposed at positions where the ignition plug is interposed therebetween, the fuel injection apparatus comprising:
    an injector that is disposed at a position offset from the ignition plug toward the intake port and injects a fuel spray toward a crown surface of the piston, and
    an injection controller that causes the injector to perform injection in accordance with an amount of fuel injection and timing of fuel injection that are preset in accordance with an operating state of the engine,
    wherein the piston includes:
        a first recess formed by recessing a central portion of the crown surface; and
        a second recess that is formed by recessing part of the first recess on an injector side further than the first recess,
    wherein the injector injects 50% or more of fuel that is to be injected for the last fuel injection toward the second recess during a compression stroke of the engine, and injects part of the fuel to be injected for the last fuel injection toward an area of the first recess other than the second recess,
    wherein the second recess has;
        a bottom surface located lower with respect to other portions of the crown surface,
        stepped portions formed along an outer peripheral edge of the bottom surface of the second recess continuously over the entire circumference and surrounding the bottom surface, and
        a pair of lateral sides each formed straightly along an outer peripheral edge of the second recess so as to extend substantially in parallel to the straight line that connects the injector and the ignition plug when seen in a direction of an axial line of a cylinder bore of the cylinder,
    wherein the stepped portions comprise:
        a central-side step that constitutes an end of the recess on a bore central side and has a plan view having an arcuate shape protruding on an exhaust side when seen in the direction of the axial line of the cylinder bore,
        an outer-diameter-side step that constitutes part of an end of the recess on a bore outer diameter side and has an arcuate shape protruding on an intake side in plan view when seen in the direction of the axial line of the cylinder bore, and
        straight guide steps that constitute a pair of lateral portions provided in parallel to each other so as to linearly couple both ends of the central-side steps and both ends of the outer-diameter-side step, each of the straight guide steps being formed along each of the pair of lateral sides, and
    wherein the injector comprises a multiple hole injector that forms multiple beams including fuel sprays and travelling in a radial fashion, and the injector injects a half or more of the multiple beams toward the second recess and injects one or more of the multiple beams toward the area of the first recess other than the second recess at the last fuel injection that is performed during the compression stroke of the engine, and
    wherein the injector is configured to inject a half or more of the multiple beams toward a first area adjacent to an end of the outer-diameter-side step on the bore outer diameter side, a second area adjacent to one of the straight guide steps and a third area adjacent to another of the straight guide.

2. The fuel injection apparatus according to claim 1, wherein, among the multiple beams, the injector injects one or more beams travelling along a straight line that connects the injector and the ignition plug and a plane including a center axis of the cylinder and two or more of the multiple beams in a pair travelling substantially symmetrically with respect to the plane toward the second recess at the last fuel injection performed during the compression stroke of the engine.

3. The fuel injection apparatus according to claim 1, wherein the second recess includes a plurality of hitting areas, where beams injected from the injector hit, disposed substantially on a plane including the straight line that connects the injector and the ignition plug and the center axis of the cylinder,
    wherein the plurality of hitting areas includes:
        a first hitting area is disposed in the first area,
        a first pair of hitting areas and a second pair of hitting areas disposed in the second area, and
        a second hitting area is disposed in the first recess at a position deviated radially outward from the central-side step.

4. The fuel injection apparatus according to claim 3, wherein the first pair of hitting areas and the second pair of hitting areas are disposed in substantially plane symmetry with respect to the plane.

5. The fuel injection apparatus according to claim 3, wherein the fuel sprays reaching the first pair of hitting areas and the second pair of hitting areas from the injector proceed substantially symmetrically with respect to the plane.

6. The fuel injection apparatus according to claim 3, wherein the first pair of hitting areas are disposed on a side closer to the first hitting area in a longitudinal direction of the straight guide steps than the second pair of hitting areas.

7. The fuel injection apparatus according to claim 3, wherein the second pair of hitting areas are disposed on a side farther from the first hitting area in the longitudinal direction of the straight guide steps than the first pair of hitting areas.

8. The fuel injection apparatus according to claim 3, wherein the first pair of hitting areas and the second pair of hitting areas are disposed offset from being in substantially plane symmetry with respect to a plane including the straight line that connects the injector and the ignition plug and the center axis of the cylinder.

* * * * *